US008441336B2

(12) United States Patent
Rickrode

(10) Patent No.: US 8,441,336 B2

(45) Date of Patent: May 14, 2013

(54) SYSTEM AND METHOD FOR SECURE SHIPMENT OF HIGH-VALUE CARGO

(76) Inventor: C. Joseph Rickrode, Nashua, NH (US)

( * ) Notice: Subject to any disclaimer, the term of this patent is extended or adjusted under 35 U.S.C. 154(b) by 483 days.

(21) Appl. No.: 12/822,907

(22) Filed: Jun. 24, 2010

(65) Prior Publication Data

US 2010/0257904 A1 Oct. 14, 2010

Related U.S. Application Data

(63) Continuation-in-part of application No. 12/761,879, filed on Apr. 16, 2010, which is a continuation-in-part of application No. 12/589,540, filed on Apr. 16, 2009, now abandoned, which is a continuation-in-part of application No. 11/496,677, filed on Jul. 31, 2006, now Pat. No. 7,525,435.

(60) Provisional application No. 61/220,113, filed on Jun. 24, 2009, provisional application No. 60/704,785, filed on Aug. 2, 2005, provisional application No. 60/704,786, filed on Aug. 2, 2005, provisional application No. 60/704,787, filed on Aug. 2, 2005.

(51) Int. Cl.

| | |
|---|---|
| ***E05B 65/52*** | (2006.01) |
| ***E05B 47/00*** | (2006.01) |
| ***G06F 7/04*** | (2006.01) |

(52) U.S. Cl.

USPC ..................... 340/5.73; 340/542; 340/539.11; 340/539.13; 340/5.7; 340/5.8

(58) Field of Classification Search ............. 340/539.11, 340/539.1, 539.13, 539.17, 540, 542, 5.7, 340/5.8, 6.1; 70/57.1

See application file for complete search history.

(56) References Cited

U.S. PATENT DOCUMENTS

| | | | | |
|---|---|---|---|---|
| 4,990,757 | A | 2/1991 | Edwards et al. | |
| 5,392,531 | A | 2/1995 | Christensen et al. | |
| 5,751,973 | A | 5/1998 | Hassett | |
| 5,974,368 | A | 10/1999 | Schepps et al. | |
| 6,195,602 | B1 | 2/2001 | Hazama et al. | |
| 6,340,935 | B1 | 1/2002 | Hall | |
| 6,865,539 | B1 | 3/2005 | Pugliese, III | |
| 6,945,303 | B2 | 9/2005 | Weik, III | |
| 6,970,101 | B1 | 11/2005 | Squire et al. | |
| 6,977,580 | B2 | 12/2005 | Banerjee et al. | |
| 7,161,563 | B2 | 1/2007 | Vitale et al. | |
| 7,253,715 | B2 * | 8/2007 | Bates | 340/5.73 |
| 7,600,683 | B2 | 10/2009 | Firestone | |
| 7,714,708 | B2 * | 5/2010 | Brackmann et al. | 340/539.1 |

(Continued)

*Primary Examiner* — Hai Phan

*Assistant Examiner* — Peter Mehravar

(74) *Attorney, Agent, or Firm* — Luis Figarella

(57) ABSTRACT

A system for protecting high-value cargo enclosed in a container, while maintaining the container indistinguishable from similar low value shipments, includes an onboard identity module (OBIM) cooperative with an internal locking mechanism (ILM), both of which are externally undetectable. The OBIM can secure the ILM and prevent the container from being opened until a properly encoded unlocking signal from a Security Management System (SMS) is wirelessly received by the OBIM. The unlocking signal can be a composite including a plurality of species of wireless signals such as different frequencies of AM and FM encoded RF and acoustic signals, transmitted simultaneously and/or at specified intervals. In embodiments the OBIM enables remote tracking of the container, and in some embodiments the tracking is double-blind, whereby a Master Number (MN) recorded in shipping documents is associated with a "Random Number" (RN) used for tracking, the association being known only to the SMS.

22 Claims, 8 Drawing Sheets

U.S. PATENT DOCUMENTS

| | | | | |
|---|---|---|---|---|
| 8,058,985 | B2 * | 11/2011 | Dobson et al. | 340/539.1 |
| 8,069,693 | B2 * | 12/2011 | Powers et al. | 70/14 |
| 2003/0179073 | A1 * | 9/2003 | Ghazarian | 340/5.6 |
| 2004/0183673 | A1 * | 9/2004 | Nageli | 340/539.13 |
| 2006/0164239 | A1 * | 7/2006 | Loda | 340/539.22 |
| 2008/0094209 | A1 * | 4/2008 | Braun | 340/539.13 |
| 2009/0109023 | A1 | 4/2009 | Newman | |
| 2009/0134999 | A1 * | 5/2009 | Dobson et al. | 340/539.1 |
| 2009/0322510 | A1 * | 12/2009 | Berger et al. | 340/539.1 |

* cited by examiner

SYSTEM AND METHOD FOR SECURE SHIPMENT OF HIGH-VALUE CARGO

RELATED APPLICATIONS

This application is a continuation in part of U.S. application Ser. No. 12/761,879, filed on Apr. 16, 2010, which is a continuation in part of U.S. application Ser. No. 12/589,540, filed Apr. 16, 2009, which is a continuation in part of U.S. application Ser. No. 11/496,677, filed Jul. 31, 2006, which claims the benefit of U.S. Provisional Application Nos. 60/704,785, filed Aug. 2, 2005, 60/704,786, filed Aug. 2, 2005 and 60/704,787, filed Aug. 2, 2005. U.S. application Ser. No. 12/761,879 also claims the benefit of U.S. Provisional Application No. 61/220,113, filed Jun. 24, 2009. This application is also a continuation in part of U.S. application Ser. No. 12/589,540, filed Apr. 16, 2009. This application also claims the benefit of U.S. Provisional Application No. 61/220,113, filed Jun. 24, 2009. All of the above noted applications are incorporated herein by reference in their entirety for all purposes.

FIELD OF THE INVENTION

The invention relates to technologies for shipment of cargo, and more particularly to technologies for maintaining the security of cargo during shipment.

BACKGROUND OF THE INVENTION

The need to protect cargo while in transit has existed since ancient times, but recent changes in the manner in which cargo is shipped, as well as a huge increase in the sheer volume of cargo which is shipped, has given rise to new and special challenges with regard to tracking and protecting such cargo.

In particular, cargo is often shipped in standardized “containers,” which can be loaded at a point of origin, and then shipped to a destination via a combination of mobile entities including truck, rail, and sea transportation among others. Note that the term “mobile entity” is used herein to denote any and all transportable entities, including self-powered vehicles such as autos and trucks as well as entities which are transported by auxiliary means and/or methods such as transporting trailers, cargo containers, cartons, skids, pallets, and such like. The entire journey can include as many as five or more transfers between carriers, as well as temporary storage at consolidation and/or distribution centers, before the container finally arrives at the destination.

Other present-day methods of shipping cargo include shipment by semi-trailer, enclosed truck, enclosed rail car; transportable tanker, and such like. It is common for a trailer or other container to be transferred between different carriers while en route. For example, a trailer may be pulled by more than one tractor, or may be carried during portions of its journey on a rail car, barge, or ship so as to achieve maximum transport efficiency and economy. Problems which can occur en route include theft of the entire container, a container break-in and theft of some or all of its contents, and containers getting lost, delayed, or diverted erroneously or intentionally.

A tracking system is sometimes used to keep track of a shipment while it is en route to its destination. One approach to tracking such shipments is to provide each container, truck, etc. with a unique, identifying number or code, which can be displayed on a printed tag for reading or scanning while en route. RFID tags can also be used for this purpose. As an alternative, an electronic tracking device can be included with the shipment, whereby the tracking device uses wireless communication to report its location, both to monitoring stations and/or while in route using cell phone or similar technology.

While these present-day shipping methods can be very efficient, they present special challenges regarding how to maintain the security of cargo during transit and protect it against tampering, theft, and such like. High-value cargo presents special security challenges while en route, since it is likely to be singled out and targeted by thieves, vandals, and/or other persons wishing to interfere with the cargo’s delivery, and/or to steal it.

The traditional approach to protecting high-value cargo is to provide special encasement, surveillance, and even guards. An example would be an armored car transporting cash between banks. However, while these approaches can provide additional protection against thieves, vandals, terrorists, and such like, they also tend to be very expensive. And unless the level of protection is very strong, these high security approaches can actually do more harm than good, since they serve to draw attention to the high-value cargo, and provide a very recognizable target for thieves, vandals, and other potential threats.

On the other hand, if high-value cargo is shipped without special protection, it can be highly vulnerable to tampering and theft. In particular, if a shipment tracking system is included, as is often the case for high-value cargo so as to mitigate the risk of loss due to accidental misdirection, the tracking system can actually serve to increase the danger that the high-value cargo will be singled out and stolen, vandalized, or otherwise hindered or tampered with. In particular, someone with access to shipping paperwork may accept a bribe from a thief to provide a tracking number for an especially valuable shipment, and may even cooperate further by accessing the tracking system and providing location information to the thief. Or a sophisticated thief may find a way to gain unauthorized access to a tracking system, for example by intercepting wireless communications between monitoring stations and the shipment, and then use the information to track and locate the high-value shipment for the purpose of intercepting it.

What is needed, therefore, is a system for increasing the security of high value cargo while en route, without providing a mechanism for a potential threat to identify, locate, track and/or intercept the cargo.

SUMMARY OF THE INVENTION

A system is provided for protecting a shipment of high-value cargo while en route without providing a mechanism for malevolent entities to single out, identify, track, or locate the shipment. An internal locking system or “ILM” is configured to securely lock the container, and an onboard identity module, or “OBIM,” is cooperative with the ILM and able to secure the ILM so that it cannot be unlocked until it is released by the OBIM, thereby preventing unauthorized access to the cargo. Both the ILM and the OBIM are externally imperceptible when the container is closed.

The OBIM is configured for wireless communication, and will only release the ILM when it receives a properly encoded unlocking signal from a “Security Management System” or “SMS”. A standard door-opening mechanism is installed on the exterior of the container, so as to further secure the container and so as to render the container indistinguishable from similar containers (typically hundreds of thousands of similar containers) carrying lower-value cargo for which the present invention has not been implemented. The result is heightened security for the high-value cargo without sacrificing the protection which naturally arises due to the shipment being perceived as only one of a very large number of unremarkable and nearly identical shipments of lower-value cargo.

A unique Master Number or "MN" is assigned to each OBIM, either temporarily or permanently, and is stored electronically by the OBIM. In various embodiments the MN is also visibly indicated on a Module Body Tag "MBT" which is permanently attached to the OBIM housing. In some embodiments, the MN is used to associate the OBIM with the shipping papers (which are stored at the point of origin and/or forwarded separately to the destination) and/or with shipping information stored by the SMS. In certain embodiments, the shipping information includes container, cargo, and/or routing information. In some embodiments a removable External Encoded Tag or "EET" is also provided, which includes a visible indication of the MN, and which is initially present with the OBIM but can be removed and associated with the shipping papers held by the original shipper before the cargo is shipped.

In some embodiments, the MN serves as the unlocking signal for the OBIM. In certain embodiments, a Composite On-Board identity or "COBI" is provided to the OBIM as the unlocking code, either as the MN or as a separate unlocking code, whereby the COBI includes a plurality of species of wireless signal, all of which must be transmitted to the OBIM before the OBIM will release the ILM and allow access to the cargo. The species of wireless signal included in the COBI can include any combination of various radio and RF frequencies, including signals encoded by AM and/or by FM means, as well as acoustic signals. In various embodiments the signals must be transmitted all at once, or in a specified sequence separated by specified time intervals.

In some embodiments, the OBIM also enables remote tracking of the container during shipment. While en route, the OBIM wirelessly communicates with the SMS via monitoring stations and/or directly via cell phone or similar means.

In some embodiments, before the high-value cargo is shipped, the SMS assigns a "random number" or "RN" to the shipment, and communicates the RN to the OBIM, after which the RN is used in place of the MN as the primary identifying feature of the shipment. The RN is not necessarily random, but is at least selected or generated by the SMS in such a way that it cannot be associated with the MN, or otherwise with the shipment, except through access to information stored by the SMS. In embodiments, the RN is assigned to the cargo and transmitted to the OBIM only after the cargo has been loaded and the container has been sealed. In some of these embodiments, this is performed at a departure location which is physically separate from a loading location, and/or it is performed by personnel who are distinct from the personnel who loaded the cargo. In various embodiments, neither the driver nor any other personnel are aware of the association between the RN and the MN, which can be obtained only from the SMS by authorized personnel.

In various embodiments, once the RN has been communicated to the OBIM, it is the RN which is used to track the shipment. The MN is not used again until the shipment has reached its destination. Since access to the information stored in the SMS is restricted and controlled according to methods well known in the art, this ensures that only a very few, highly trusted, authorized individuals who are associated with the shipping activity will be able to associate the RN with the MN.

In some embodiments, once the RN has been transmitted to the OBIM, the OBIM will refuse to transmit the MN until a pre-defined, encoded authorization signal is sent to the OBIM by the SMS. This ensures that the MN cannot be solicited or detected en route if the OBIM information somehow falls into the hands of unauthorized individuals. In some of these embodiments the authorization signal is composed of more than one signal type consistent with the OBIM wireless capabilities, such as a combination of RF signals carrying encrypted patterns of various types, transmitted on different frequencies, modulated between multiple frequencies, and such like.

In certain embodiments, a multi-component COBI MN and/or RN includes one component which is used for tracking and another component which is used for identity verification, non-tampering indications, and/or OBIM functions related to unlocking the OBIM and/or the container at the delivery point.

In some embodiments, routing instructions are transmitted by the SMS to various monitoring locations and/or carriers as the shipment progresses, thereby ensuring that even the routing and the eventual destination cannot be used to surmise the contents of the container.

In certain embodiments, since the SMS assigns an RN to the OBIM, the SMS is solely responsible for monitoring the movement and/or any tampering attempts via the RN. In various embodiments the SMS can change the RN which is assigned to the OBIM while the container is en route, so as to further inhibit any attempts by unauthorized persons to track a particular container.

Another general aspect of the present invention is a system for tracking and protecting high-value cargo provides tracking of the cargo during shipment while at the same time guaranteeing the anonymity of the cargo through a "double-blind" method of tracking identification. The result is full tracking capability, without sacrificing the protection which naturally arises due to the shipment being perceived as only one of a very large number of unremarkable and nearly identical shipments.

An onboard identity module, or "OBIM," is attached to the container in which the high-value cargo is to be shipped. While en route, the OBIM wirelessly communicates with tracking devices and/or directly with a "tracking management system" or "TMS" via cell phone or similar means. A "master number" or "MN" is permanently assigned to the OBIM, and is used to associate the OBIM with the shipping papers (which are stored at the point of origin and/or shipped separately to the destination) and with shipping information stored by the TMS. In various embodiments, the shipping information includes container, cargo, and/or routing information. The MN is also stored electronically by the OBIM, and in various embodiments it is visibly included on a Module Body Tag "MBT" which is permanently attached to the OBIM. In some embodiments a removable External Encoded Tag or "EET" is also provided, which includes a visible indication of the MN, and which is initially present with the OBIM but is removed and associated with the shipping papers before the cargo is shipped.

Before the high-value cargo is shipped, the TMS assigns a "random number" or "RN" to the shipment, and communicates the RN to the OBIM. The RN is not necessarily random, but is at least selected or generated in such a way that it cannot be associated with the MN, or otherwise with the shipment, except through access to information stored by the TMS. In embodiments, the RN is assigned to the cargo and transmitted to the OBIM only after the cargo has been loaded and the container has been sealed. In some of these embodiments, this is performed at a departure location which is physically separate from a loading location, and/or it is performed by personnel who are distinct from the personnel who loaded the cargo. In various embodiments, neither the driver nor any other personnel are aware of the association between the RN and the MN, which can be obtained only from the TMS by authorized personnel.

Once the RN has been communicated to the OBIM, it is the RN which is used to track the shipment. The MN is not used again until the shipment has reached its destination. Since access to the information stored in the TMS is restricted and controlled according to methods well known in the art, this ensures that only a very few, highly trusted, authorized individuals who are associated with the shipping activity will be able to associate the RN with the MN.

In some embodiments, routing instructions are transmitted by the TMS to various monitoring locations and/or carriers as the shipment progresses, thereby ensuring that even the routing and the eventual destination cannot be used to surmise the contents of the container.

One general aspect of the present invention is a system for enhancing the security of high value cargo during shipment within an enclosed container without enabling the container to be distinguished from similar shipments of lower value cargo. The system includes an Internal Locking Mechanism (ILM) configured to prevent opening of the container when the container is closed and the ILM is locked, the ILM being externally undetectable when the container is closed, a Base Unit (BU) cooperative with the ILM, the BU being externally undetectable when the container is closed, and an electronic OnBoard Identity Module (OBIM) which is removably enclosable within the BU, the OBIM when enclosed within the BU being able to secure and release the ILM, unlocking of the ILM being inhibited when the ILM is secured and unlocking of the ILM being enabled when the ILM is released, the OBIM being configured for wireless communication with external nodes when the OBIM is enclosed within the BU and the container is closed, the OBIM being able to wirelessly receive and electronically store a master identity code, herein referred to as the Master Number (MN). The system further includes a Module Body Tag (MBT) displaying a visible indication of the MN, the MBT being durably attached to the OBIM in a location which is not visible from outside the BU when the OBIM is enclosed within the BU, and a Security management System (SMS) configured for wireless communication with the OBIM, the SMS including a processor and software configured so as to direct the SMS to receive the MN from the OBIM, transmit a signal to the OBIM causing the OBIM to secure the ILM, and transmit a signal to the OBIM causing the OBIM to release the ILM.

In various embodiments the software is able to direct the SMS to generate a temporary tracking code, herein referred to as a "Random Number" (RN), which is at least unassociated with the MN, transmit the RN to the OBIM, store the RN, the MN, and the association therebetween, and prevent access to the association between the RN and the MN except by authorized users.

In certain embodiments, the software is further able to direct the SMS to store shipping information and to associate the shipping information with the MN, the shipping information including one or more of information pertaining to the high value cargo, information pertaining to the container, information pertaining to mobile entities scheduled to carry the container, information pertaining to locations of temporary storage for the container while en route, and information pertaining to a planned route of travel for the container.

Some embodiments further include a plurality of base units, each of the base units including an attachment configuration which is unique among the plurality of base units, the attachment configurations being configured such that for each of a plurality of container types at least one of the base units is attachable thereto, all of the plurality of base units having a common OBIM housing configuration, so that a single type of OBIM is containable by any of the base units and can therefore be used to secure an ILM in any of the types of container.

Various embodiments further include an External Encoded Tag (EET) including a visible indication of the MN, the EET being at least associated with the OBIM and being separable therefrom. And in some of these embodiments the EET is configured for association with a shipping document after separation of the EET from the OBIM.

Certain embodiments further include a detectable alarm unit which can be activated by the OBIM so as to emit an alarm indication which is at least one of audible and visible to individuals external to but proximate to the container, the detectable alarm unit being externally undetectable when the container is closed. And in some of these embodiments the detectable alarm unit can be activated by a command received wirelessly by the OBIM from an authorized node.

In various embodiments the OBIM is configured to release the ILM only upon wireless receipt by the OBIM of a specified unlocking signal. And in some of these embodiments the unlocking signal is a composite signal including at least two of an rf signal transmitted at a first frequency, an rf signal transmitted at a second frequency, an acoustic signal, a signal encoded by a first encoding method, a signal encoded by a second encoding method, a signal transmitted at a specified amplitude, and a signal transmitted at a specified time after a preceding signal.

In certain embodiments at least one digital signature is used by the OBIM to verify the identity of at least one of an external node and the SMS before responding to a wireless communication therefrom.

Various embodiments further include a tracking mechanism configured for wireless communication with the OBIM so as to at least obtain identifying information from the OBIM while the container is en route.

Some of these embodiments further include a global positioning system (GPS) which is at least cooperative with the OBIM and enables the OBIM to at least one of record and report location information while the container is en route. Other of theses embodiments further include a cellular telephone communication system which is at least cooperative with the OBIM and enables the OBIM to wirelessly communicate with an external node while the container is en route.

In still other of these embodiments the tracking mechanism includes at least one monitoring station which is located along a route of travel of the container and which is configured to at least wirelessly receive identifying information from the OBIM when the OBIM is proximate to the monitoring station. And yet other of these embodiments further include a route reporting mechanism configured to enable the OBIM to supply routing information to an operator of a mobile entity which is transporting the container, the routing information being wirelessly obtained by the OBIM from the SMS.

Another general aspect of the present invention is a method for enhancing the security of high value cargo during shipment within an enclosed container and tracking the container while en route from an origin to a destination, without enabling the container to be distinguished from similar shipments of lower value cargo. The method includes providing an Internal Locking Mechanism (ILM) configured to prevent opening of the container when the container is closed and the ILM is locked, the ILM being externally undetectable when the container is closed, a Base Unit (BU) which is cooperative with the ILM and externally undetectable when the container is closed, and an electronic OnBoard Identity Module (OBIM) which is removably enclosable within the BU, the OBIM when enclosed within the BU being able to secure and release the ILM, unlocking of the ILM being inhibited when the ILM is secured and unlocking of the ILM being enabled when the ILM is released, the OBIM being configured for wireless communication with external nodes when the OBIM is enclosed within the BU and the container is closed, the OBIM being able to wirelessly receive and electronically store a master identity code, herein referred to as the Master Number (MN), a master body tag (MBT) including a visible indication of the MN being durably attached to the OBIM in a location which is not visible when the OBIM is enclosed within the BU.

The method further includes providing a Security management System (SMS) configured for wireless communication with the OBIM, the SMS including a processor and software configured so as to direct the SMS to receive the MN from the OBIM, generate a temporary tracking code, herein referred to as a "Random Number" (RN), which is at least unassociated with the MN, transmit the RN to the OBIM, store the RN, the MN, and the association therebetween, prevent access to the association between the RN and the MN except by authorized users, transmit signals to the OBIM causing the OBIM to secure the ILM, and transmit signals to the OBIM causing the OBIM to release the ILM, and providing a tracking mechanism which is at least able to wirelessly obtain OBIM shipment identifying information from the OBIM when the container is proximal to a specified location along a planned route of travel of the container.

The method also includes enclosing the OBIM within the BU in a manner which prevents observation of the MBT, loading the cargo into the container, closing and securing the container, including locking the ILM, transmitting by the SMS of a signal to the OBIM causing the OBIM to secure the ILM, causing the SMS to wirelessly receive the MN from the OBIM, generate an RN, transmit the RN to the OBIM, and store the MN, the RN, and the relationship therebetween, while the container is en route, using the tracking system to wirelessly receive the RN from the OBIM so as to derive therefrom location information pertaining to the container, and upon arrival of the container at the destination, transmitting by the SMS of a signal to the OBIM causing the OBIM to release the ILM.

Various embodiments further include transmitting routing information to the OBIM while the container is en route, and causing the OBIM to make the routing information available to an operator of a mobile entity which is transporting the container.

Certain embodiments further include causing the SMS to transmit a signal to the OBIM instructing the OBIM to cease transmission until a specified criterion is met.

Some embodiments further include, upon detection of an abnormal indication from the OBIM, resolving by security-authorized personnel of any issues and assessing of the OBIM's security and integrity status, advising by security-authorized personnel of a shipper of any and all related details, and informing of a receiver of details when and if directed to do so by the shipper;

conducting of steps to confirm that any suspected tampering did not violate the security of the BU or functionally alter its operation, confirming proper OBIM security functionality, replacing the OBIM if necessary, and repeating any necessary programming steps, as determined by the shipper and/or the receiver to be necessary to permit in-route control and tracking to resume, and/or if so identified initially, replacing an old RN tag or label on the mobile entity's exterior with a tag or label showing a replacement RN just assigned by the SMS for visual in-route monitoring by the tracking mechanism.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a system for providing increased security for high-value cargo while at the same time preserving the natural protection which arises due to the shipment being indistinguishable from the large majority of similar shipments which are not carrying high value cargo.

With reference to FIGS. 1A through 2B, the system includes a secure Internal Locking Mechanism ("ILM") 106, 108 which is able to securely lock the cargo container 104, the ILM being configured so as not to be externally perceptible when the container is closed. The ILM 106, 108 is cooperative with a Base Unit ("BU") 100 which is configured to contain an On-Board Identity Module ("OBIM") 200. The OBIM 200 is configured to secure the ILM 106, 108 so as to prevent it from being unlocked until proper unlocking authorization is wirelessly received by the OBIM 200.

Figure 1A:
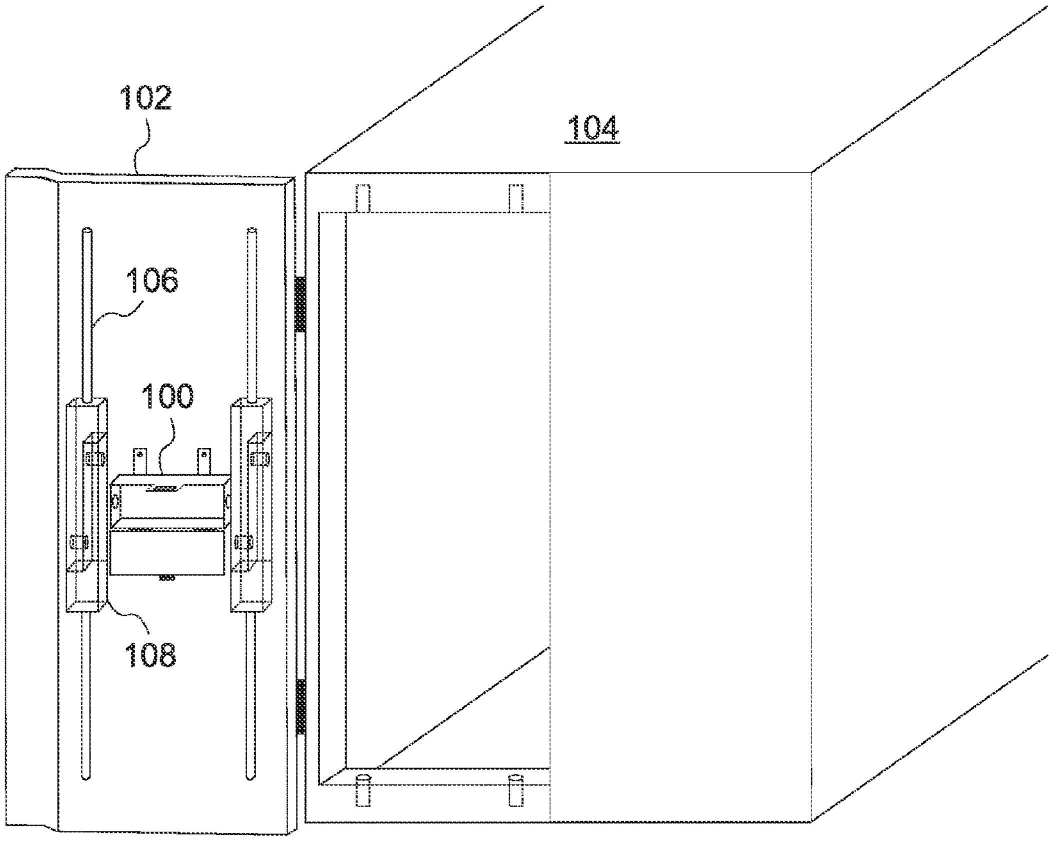
FIG. 1A is a perspective view of the front of a shipping container with one container door open, showing an ILM and BU of an embodiment of the present invention attached to an interior surface of the open door, the ILM being in its unlocked configuration.

In embodiments, a common type of OBIM 200 can be used for protecting many different types of cargo container 104 by providing a variety of differently configured BU's 100 configured for attachment to different types of container 104, all of the BU's 100 being compatible with the same type of OBIM 200. FIG. 1A shows a BU 100 mounted to an interior surface of a door 102 of a cargo container 104. In other embodiments, the ILM 106, 108 and/or the BU 100 are incorporated within the door 102. And in some embodiments, the ILM is cooperative with a door frame or with another structural element of the container 104. The BU is shown in FIG. 1A with its lid open, and without an OBIM 200 installed.

Figure 1B:
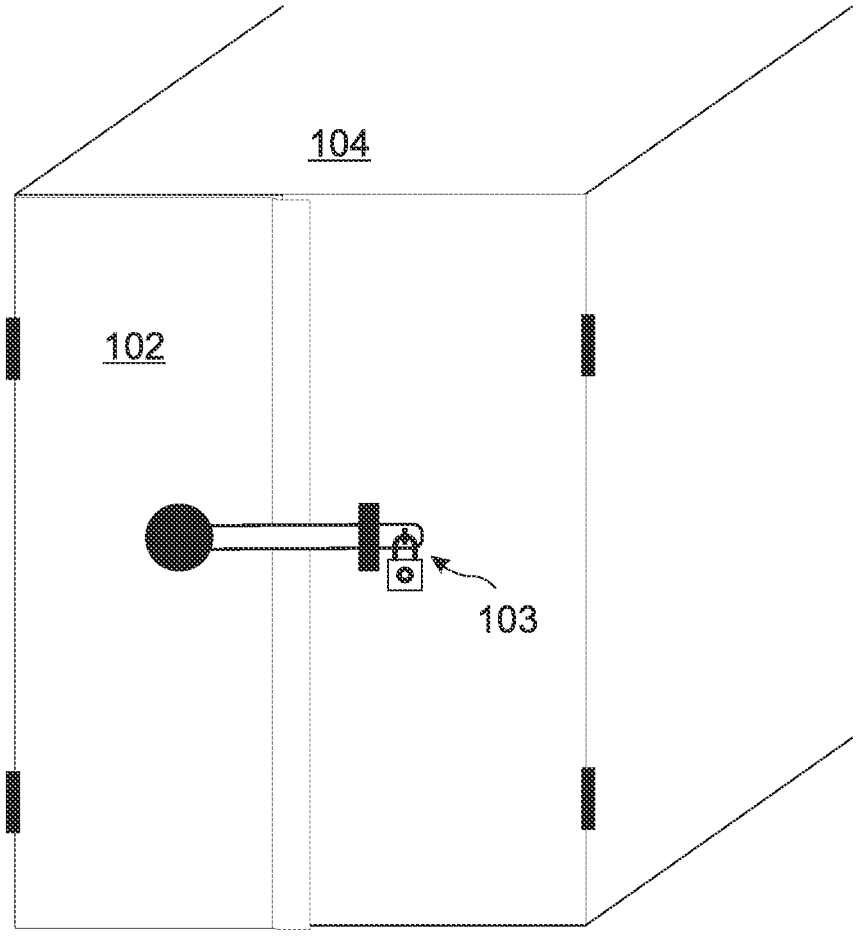
FIG. 1B is a perspective view of the rear of the shipping container of FIG. 1A with its door closed and locked, showing no indications that the present invention has been implemented.

With reference to FIG. 1B, the conventional latching and locking mechanism 103 installed by the container manufacturer is visible on the exterior of the container 104, so that once the container 104 has been closed and locked, it is indistinguishable from similar containers for which the present invention has not been implemented. Although not indicated in detail in FIGS. 1A and 1B, the ILM 106, 108 in this embodiment is cooperative with the conventional latching mechanism 103, so that when it is released by the OBIM 200, the ILM 106, 108 is operated by movement of the lever of the conventional latching mechanism 103. In all cases, the OBIM securing of the ILM must be released before the ILM can be unlocked and the container can be opened.

Figure 2B:
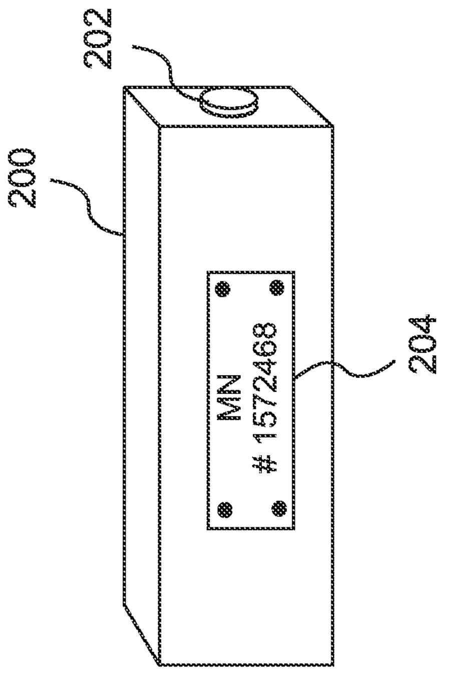
FIG. 2B is a perspective view of the back side of an OBIM of an embodiment of the present invention, an MBT being attached thereto in a location which is not visible when the OBIM is contained within the BU.
Figure 2A:
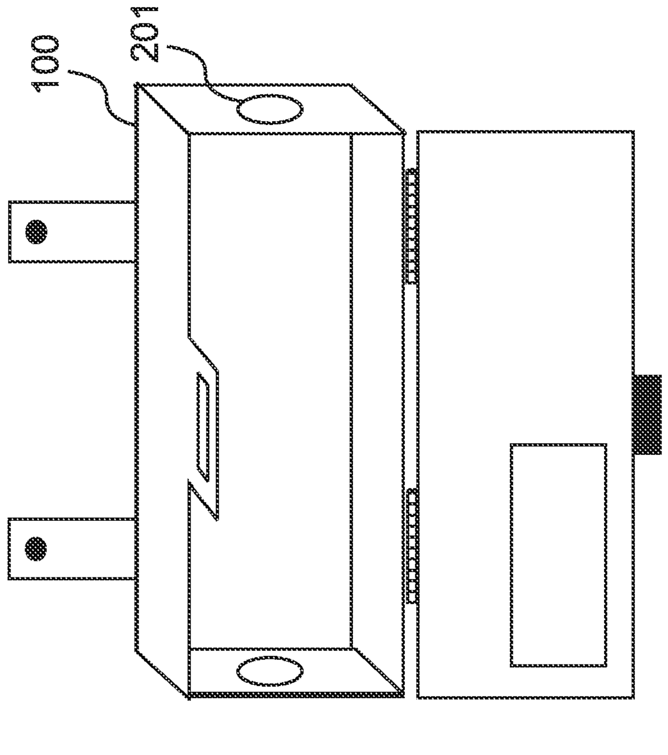
FIG. 2A is a close-up view of the BU of FIG. 1.

FIG. 2A is a close-up view of the BU 100 of FIG. 1A. Openings 201 are provided in the sides of the BU so as to allow securing rods 202 from the OBIM 200 to pass through.

FIG. 2B is a perspective rear view of an OBIM 200 which is compatible with the BU 100 of FIG. 2A. Securing rods 202 can be seen protruding slightly from the sides of the OBIM 200. The securing rods 202 are shown in FIG. 2B in their retracted configuration, in preparation for installation of the OBIM 200 in the BU 100. The securing rods 202 are configured to engage a securing mechanism 108 of the ILM 106, 108 so as to prevent the ILM 106, 108 from unlocking the door 102 of the cargo container 104 until the securing rods 202 have been withdrawn. In this embodiment, the OBIM secures the ILM 106, 108 by an entirely mechanical means. In other embodiments, the ILM 108 includes electronic locking features which are controlled electronically by the OBIM 200. For example, in certain embodiments the OBIM 200 transmits a signal through a wire to the ILM 108 which causes the securing rods 106 to be withdrawn and the door 102 to be unlocked, rather than the OBIM 200 mechanically engaging with the ILM 108 as illustrated in FIGS. 2A and 2B.

A "master number" or "MN" is assigned to the OBIM 200, and is used to associate the OBIM 200 with the shipment. In some embodiments, the MN is permanently assigned to the OBIM 200. In other embodiments, the MN assigned to the OBIM 200 can be changed or cancelled, and a new MN can be assigned to the OBIM 200 during periodic OBIM inspection and maintenance activities, whenever OBIM tampering attempts are suspected, and/or in situations where the MN may have been compromised. The MN is stored electronically by the OBIM 200, and is also visibly indicated on a Module Body Tag "MBT" 204, which is permanently attached to the OBIM in a location where it cannot be seen when the OBIM 200 is enclosed within the BU 100. In addition to storing, cataloging, and locating the OBIM 200 between uses, the MBT 204 serves as a "last resort" which can be used to identify the shipment manually, in the unlikely event that the OBIM 200 electronically fails and wireless communication with the OBIM 200 is no longer possible.

Figure 3A:
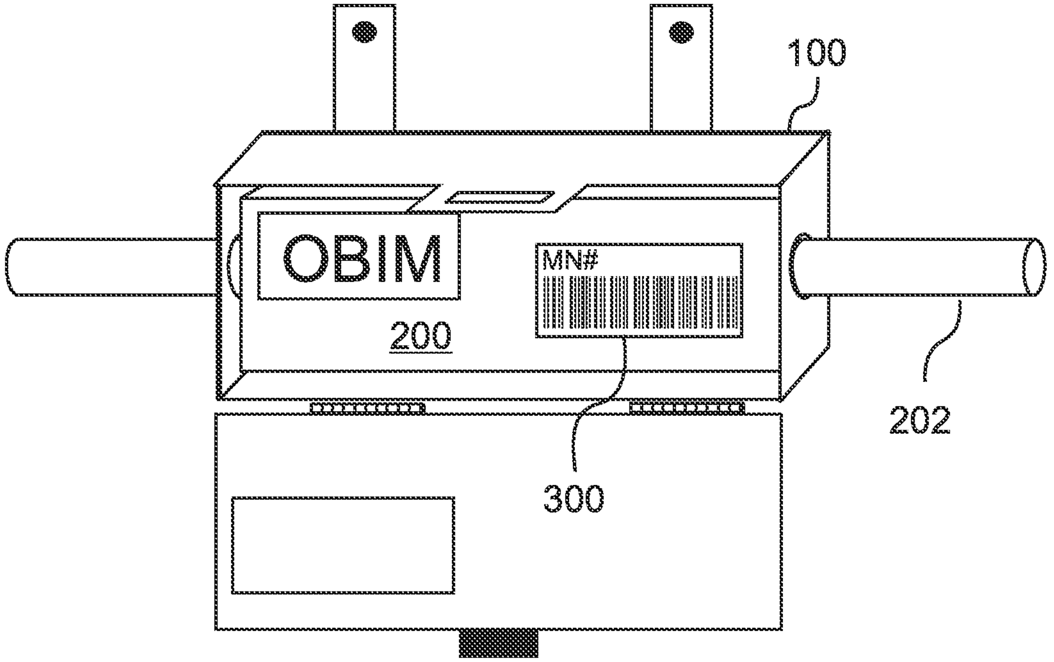
FIG. 3A is a view of the OBIM of FIG. 2B installed in the BU of FIG. 2A, showing the front panel of the BU open and the front of the OBIM visible with an EET attached thereto.

FIG. 3A illustrates the OBIM 200 of FIG. 2B installed in the BU 100 of FIG. 2A. The lid of the BU 100 open so that the front of the OBIM 200 is visible, showing an External Encoded Tag or "EET" 300 temporarily attached to the OBIM 200. The EET 300 includes a visible indication of the MN, which in the embodiment of FIG. 3A is a barcode which can be scanned by a barcode reader. In some embodiments, the indication of the MN is encoded so as to be readable only by authorized personnel. In this embodiment, the EET 300 tag/label is adhesively attached, while in other embodiments the tag or label is attached by Velcro, by a hook, or by other temporary means known in the art.

Figure 3B:
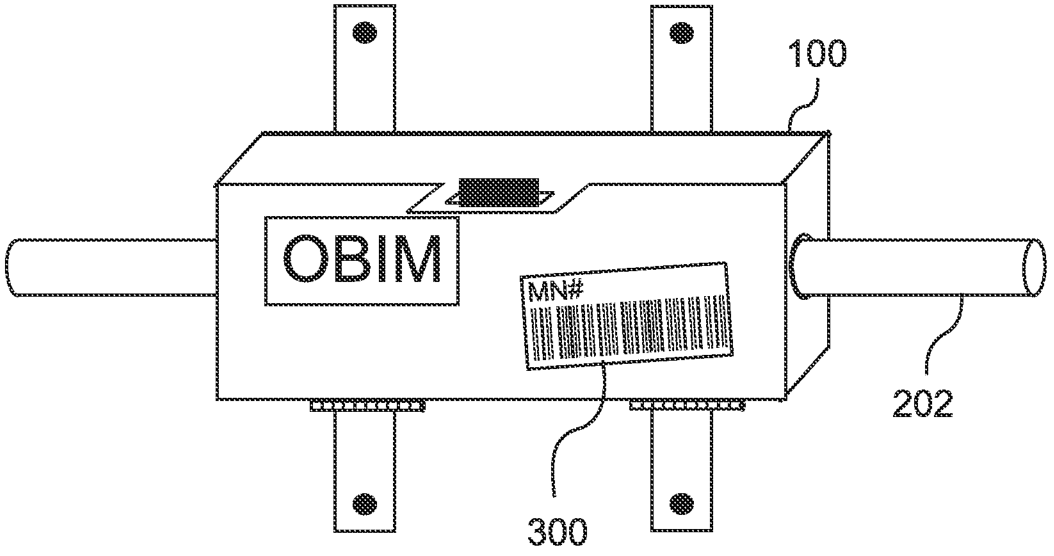
FIG. 3B is a front view of the BU with its front panel closed and the EET attached to the exterior of the BU.

In the embodiment of FIG. 3A, the EET 300 is removed before the lid of the BU 100 is closed. The EET can then be temporarily attached to the outer surfaced of the BU 100, as shown in FIG. 3B. In other embodiments, the EET 300 is a tag with a hole, and a hook is provided on or near the BU 100 where the EET 300 can be temporarily hung. In some embodiments, the BU 100 is closed and locked once the OBIM is installed, so that any attempt to gain physical access to the OBIM 200 is inhibited, and any such attempted access can be detected due to damaging of the BU 100. In certain embodiments, any unauthorized attempt to physically access the OBIM 200 once it is locked within the BU 100 causes a perceptible alarm to be triggered, and/or an alarm signal to be transmitted wirelessly by the OBIM to appropriate authorities.

Figure 4:
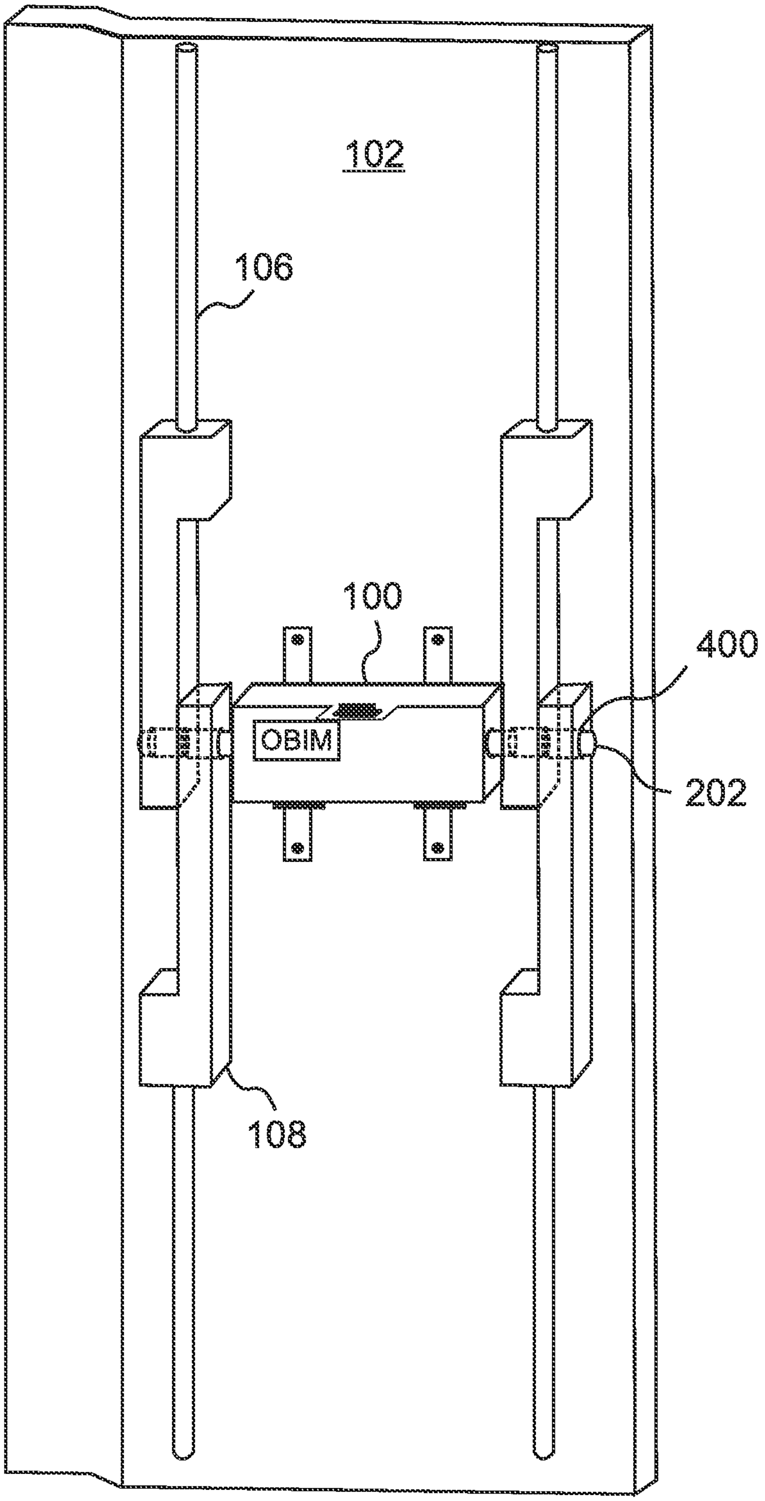
FIG. 4 is a rear view of the door of FIG. 1B showing the OBIM installed in the BU and the ILM secured in its locked configuration by the OBIM.

FIG. 4 illustrates the container door 102 of FIG. 1A with the OBIM 200 installed in the BU 100, and the ILM 106, 108 secured by the OBIM 200. It can be seen in the figure that the securing rods 202 in this embodiment secure the ILM 106, 108 by extending through aligned holes 400 in the ILM securing mechanism 108, so as to prevent the rods 106 of the ILM 106, 108 from retracting and unlocking the door 102.

Figure 6:
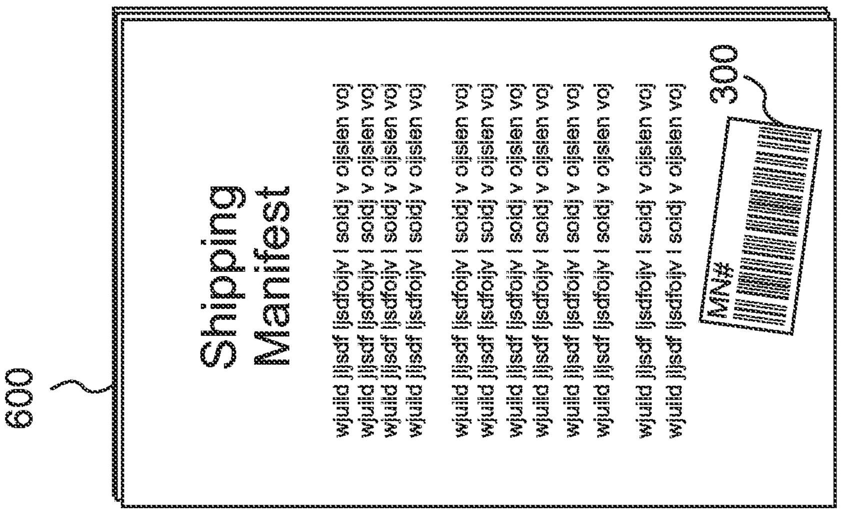
FIG. 6 is an illustration of shipping papers having the EET of FIG. 5 attached thereto.
Figure 5:
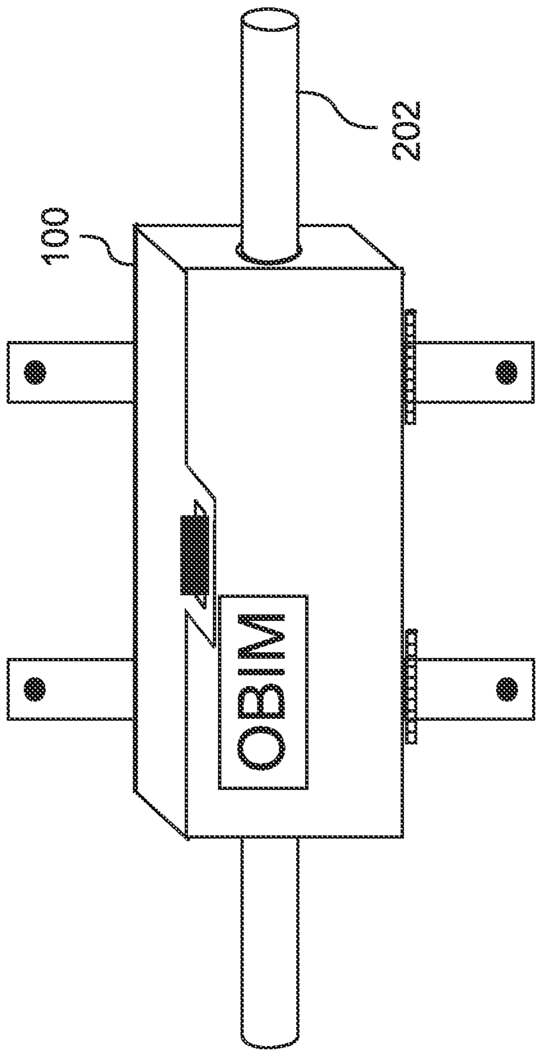
FIG. 5 is a front view of the BU with the OBIM enclosed therein, the front panel closed, and the EET removed.

FIG. 5 illustrates the closed BU 100 of FIG. 3B with the OBIM 200 contained within the BU 100, the EET 300 having been removed from the exterior of the BU 200, and FIG. 6 illustrates the EET 300 having been attached to shipping paperwork 600 associated with the high-value cargo to be protected.

Once the cargo has been loaded into the container 104 and an OBIM 200 has been installed within the BU 100, the container 104 is closed and securely locked by the ILM 106, 108 as well as by the conventional latching mechanism 103. In various embodiments, this is done in a "secured" environment, where each shipment's actual contents are known only to those filling the container 104, who might be for example bonded or security-cleared individuals.

Figure 7:
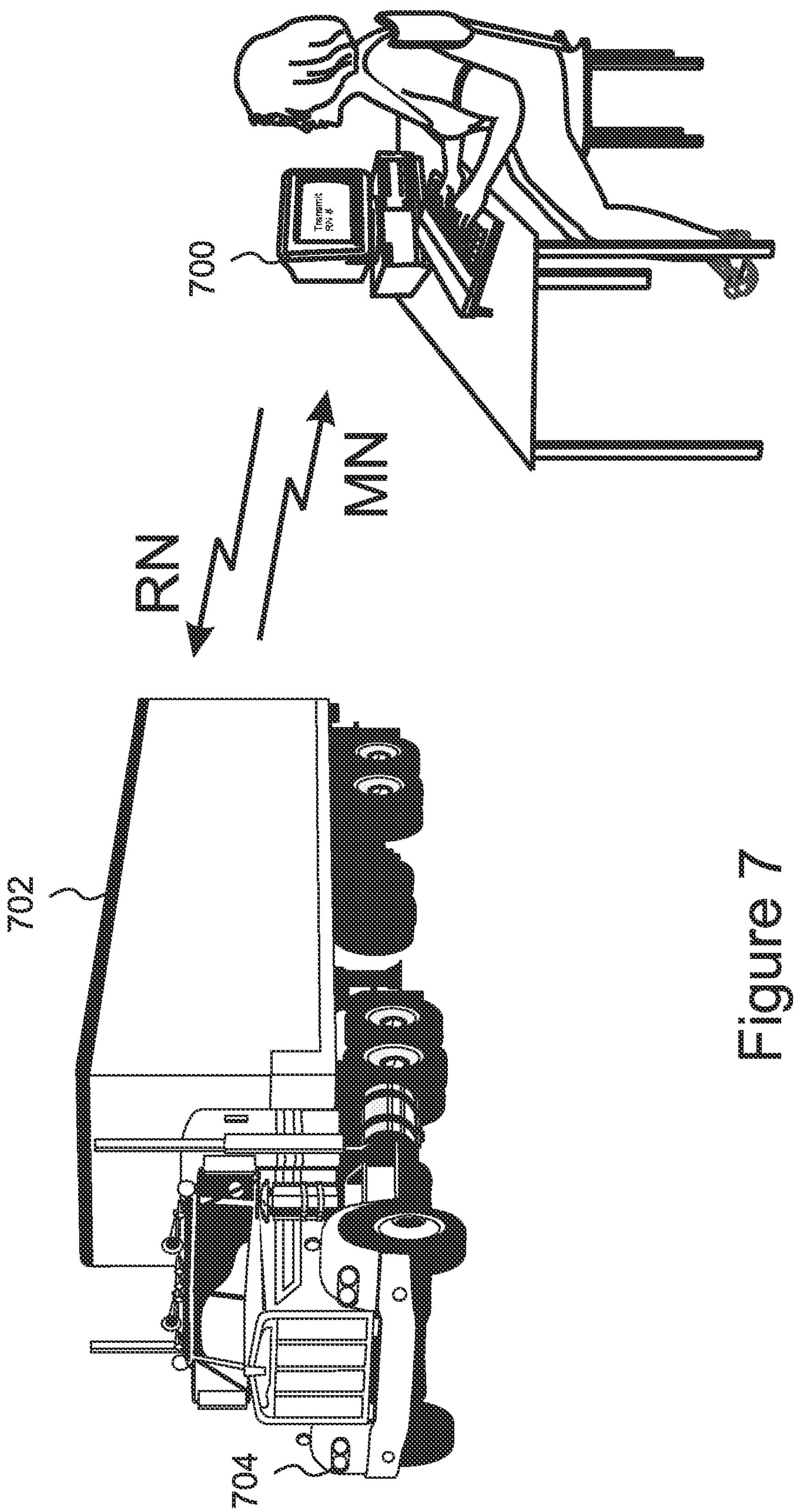
FIG. 7 illustrates an SMS in wireless communication with a truck carrying the OBIM of FIG. 4, the SMS being illustrated as wirelessly receiving and verifying the MN from the OBIM and generating and transmitting an RN to the OBIM.

With reference to FIG. 7, once the cargo has been sealed within the container 104, wireless communication is established between the OBIM 200 and a Security management System, or "SMS" 700. The SMS verifies that the OBIM 200 is functioning properly, and that the MN transmitted wirelessly by the OBIM is identical to the MN associated with the shipment. In some embodiments, the SMS 700 then assigns a "random number" or "RN" to the OBIM 200, and communicates the RN to the OBIM 200. The RN is not necessarily random, but is at least selected or generated in such a way that it cannot be associated with the MN, or otherwise with the shipment, except through access to information stored by the SMS 700. In some embodiments, the RN is visibly displayed on a tag or otherwise on the exterior of the vehicle, while in other embodiments it remains undetectable except by authorized communication with the OBIM 200.

In various embodiments, the RN is assigned to the cargo and transmitted to the OBIM 200 only after the cargo has been loaded and the container has been sealed. In some of these embodiments, the RN is assigned and transmitted at a departure location which is physically separate from a loading location, and/or it is done by personnel who are distinct from the personnel who loaded the cargo, and who have no information regarding the cargo. In certain embodiments, neither the driver nor any other personnel are aware of the association between the RN and the MN, which can be obtained only from the SMS 700 by authorized personnel. And in some embodiments, the SMS 700 also stores other shipping information associated with the shipment, such as container, cargo, and/or routing information.

In various embodiments, the RN is a COBI which includes a plurality of identity-related components which are used for different purposes. In certain of these embodiments one component is used for tracking and other components are used for identity verification, non-tampering indications, and/or for OBIM unlock functions at the destination.

In FIG. 7, the SMS is illustrated as a PC, but in various embodiments the SMS can be any system which is able to wirelessly communicate with the OBIM 200, verify the MN, generate an RN, transmit the RN to the OBIM 200, and store the correlation between the MN and the RN in a secure manner, so that only authorized personnel are able to associate the RN with the MN.

In FIG. 7, the container 104 is illustrated as being the trailer 702 of a tractor/trailer. However, the system and method of the present invention are equally applicable to other cargo-transporting mobile entities, such as trucks, railroad cars, containerized cargo containers, tank wagons, aircraft, and other transporting vehicles which are used to transport cargo. In the embodiments of FIG. 7, the headlights 704 of the tractor pulling the trailer 702 are cooperative with the OBIM 200 and can be activated by the OBIM 200 so as to flash and serve as a visible alarm. The horn of the tractor can be similarly activated as an audible alarm.

In various embodiments of the present invention the OBIM 200 is configured to enable tracking of the container 104 as it is en route. The RN is used in some of these embodiments to provide a "double-blind" identification code which cannot be linked to the shipping records and therefore cannot be used to identify the shipment as being high-value cargo.

Figure 8:
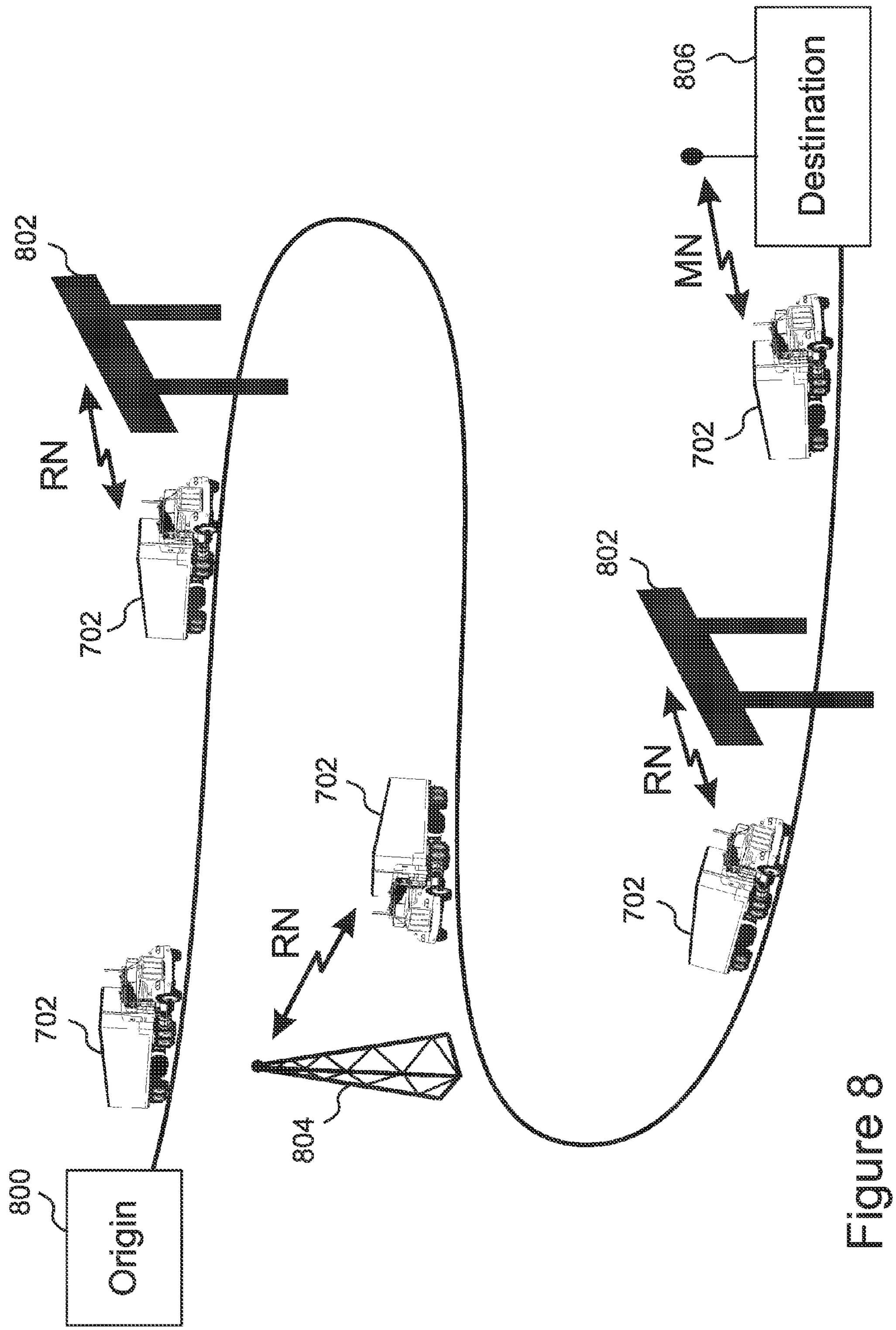
FIG. 8 illustrates the truck of FIG. 7 transmitting its RN to the SMS via monitoring stations and a cell phone tower while en route to a destination.

As illustrated in FIG. 8, in various embodiments, once the transporting vehicle 702 has departed from its point of origin 800 it is able to communicate with monitoring stations 802 along the route. In various embodiments, the monitoring stations communicate with the SMS 700 by methods known in the art, so that the SMS 700 is able to track the progress of the shipment. In some embodiments, the monitoring stations 802 are cooperative with toll booths, weigh stations, seaport cargo handling facilities, entrances to storage and distribution facilities, and such like. In various embodiments, if the OBIM fails to "broadcast" its programmed RN as expected at progressive en-route monitoring stations, the mobile entity can be detained for implementation of security examination and resolution measures.

In certain embodiments, the OBIM 200, the monitoring stations 802, and/or the SMS 700 use one or more digital signatures of various types and/or other identity verification means known in the art to protect against hostile entities attempting to obtain unauthorized information or access by "spoofing" the identities of legitimate OBIM's 200, monitoring stations 802, and SMS's 700.

In various embodiments, the OBIM 200 includes a clock and/or GPS, and is able to transmit routing information to the monitoring stations so as to verify that a predetermined schedule has been maintained. In certain embodiments where routing instructions are transmitted to the mobile entity through monitoring stations 802 or other checkpoints while the shipment is en route, the monitoring stations 802 and/or checkpoints communicate with the SMS 700 so as to progressively obtain updated routing information, which is then transmitted to the OBIM 200 and can be provided to the driver, transfer terminal, and/or port facility when and as needed, so that the planned route and destination cannot be used to identify the cargo as being high-value. This feature also allows the shipment to be re-routed if necessary according to changes in delivery requirements.

In some embodiments, the SMS 700 is able to communicate with external logistical management systems and/or networks serving the needs of the shipping handlers, such as railroad and sea freight handlers, as well as the shipment's eventual recipients. Any and all system control and management aspects of the SMS 700 which are required for communicating and interfacing with such external managements systems are included within the scope of the invention.

In some embodiments, the OBIM 200 and/or the BU 100 includes cell phone capability, which allows the OBIM 200 to communicate with cell phone towers 804 while en route. This approach is used in various embodiments in addition to or in lieu of fixed monitoring stations to track the shipment during its normal transit, and/or as a mechanism to locate and track the shipment if it departs from its assigned route and/or schedule.

In certain embodiments, the OBIM 200 can be programmed and/or commanded to stop all broadcasting for one or more specified periods of time, so as to save power and also so as to minimize opportunities for a hostile agent to detect the presence of the OBIM or to attempt to communicate with the OBIM while the shipment is en route. This provides further protection against the mere presence of the OBIM being used as a means to single out the shipment as being possibly being high-value.

By providing an RN as a tracking number which cannot be associated with the shipment origin, destination, or contents in any way, embodiments of the present invention therefore provide full tracking capability without sacrificing the protection which naturally arises due to the shipment being indistinguishable from any of a very large number of unremarkable and nearly identical shipments.

In various embodiments, once the transporting vehicle 702 arrives at the destination 806, the RN is received from the OBIM 200 and transmitted to the SMS 700 to confirm the arrival of the shipment and to demonstrate that the OBIM 200 remains functional and free of tampering. The SMS responds by supplying the corresponding MN and/or any other unlocking codes and/or instructions to the receiver. The MN and/or an unlocking code is then transmitted to the OBIM 200, and serves as a virtual "key" which causes the OBIM 200 to release the ILM 106, 108 so that the container can be opened. In some embodiments, the OBIM 200 physically unlocks the ILM 106, 108, or the OBIM 200 sends a signal to the BU 100 which causes the BU 100 to unlock the ILM 106, 108. In various embodiments, the SMS 700 also transmits or allows the transmission of a manifest of the contents of the shipment to the receiver, or sends instructions to the receiver as to how such a manifest can be obtained.

In embodiments where the MN is used instead of an RN for all relevant monitoring and securing purposes, the MN is received from the OBIM 200 and transmitted to the SMS 700 to confirm the arrival of the shipment and to demonstrate that the OBIM 200 remains functional and free of tampering. The subsequent activities described in the foregoing then occur.

After the shipment is complete, depending on OBIM design and security levels or practices required, the used OBIM 200 can be:

Reused without functional checking but supplied with a new EET 300 for placement on the BU 100;

Reused after functionally checking the OBIM 200 plus cancelling and replacing the assigned MN with a new MN, verifying it is readable by the SMS 700, and supplying a new EET 300 for placement on an accessible location and a new MBT 204 on the OBIM periphery in a location which is concealed when the OBIM 200 is installed within the BU 100;

Functionally checked in the BU 100 or removed & verified elsewhere, and then recycled with a new EET 300; or Replaced with a new OBIM unit 200 having a new MN and a new MBT 204 and EET 300.

If an attempt is made to gain unauthorized access to the OBIM 200 while en route, various embodiments respond in different ways. The ability of the OBIM 200 to release the ILM 106, 108 can be disabled, after which authorized intervention is required so as to reset and unlock the OBIM 200. Some embodiments include a detectable alarm unit, such as an audible alarm and or a visible light, which can be activated by the OBIM 200 so as to alert nearby personnel to the unauthorized attempt. In some embodiments, the detectable alarm unit can also be activated remotely so as to facilitate locating of the shipment, for example if it is located in a storage or staging facility, or stacked with a plurality of nearly identical containers on a ship.

Embodiments of the BU 100 are constructed so as to clearly indicate damage due to unauthorized tampering. In some embodiments, the OBIM 200 is able to detect opening of the BU 100, and in some of these embodiments, if the opening is unauthorized, the OBIM 200 will transmit an alert signal to the SMS 700, and/or will shut down. In various of these embodiments, when the OBIM 200 detects tampering, it will erase the RN and/or the MN from its memory and/or otherwise reset itself, so that it must be either replaced or fully reset by the SMS 700 with a new RN and/or MN after the incident has been investigated and before the transit of the cargo can resume.

In some embodiments, an alarm condition indicated by the OBIM 200 leads to any or all of the following steps:

security-authorized personnel resolve any issues and assess the mobile entity's security and integrity status;

security-authorized personnel advise the shipper of any and all related details, and inform the receiver of details when and if directed to do so;

steps are conducted to confirm that any suspected tampering did not violate the security of the BU 100 or functionally alter its operation;

proper OBIM 200 security functionality is confirmed;

the OBIM 200 is replaced if necessary, and any necessary programming steps are repeated, as determined by the shipper and/or the receiver to be necessary to permit en-route control and tracking to resume;

if so identified initially, the old MN or RN tag or label on the mobile entity's exterior is replaced with a tag or label showing the replacement MN or RN just assigned by the SMS 700 for visual en-route monitoring by all enroute handlers The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for enhancing the security of high value cargo during shipment within an enclosed cargo container without enabling the cargo container to be distinguished from similar cargo containers carrying shipments of lower value cargo, the system comprising:

a plurality of cargo containers, each of the cargo containers being an enclosed container that exclusively contains cargo;

each of the cargo containers including an Internal Locking Mechanism (ILM) configured to prevent opening of the cargo container when the cargo container is closed and the ILM is locked, the ILM being externally undetectable when the cargo container is closed;

each of the cargo containers including a Base Unit (BU) at least attached within the cargo container and cooperative with the corresponding ILM, the BU being externally undetectable when the cargo container is closed;

an electronic OnBoard Identity Module (OBIM) which is removably enclosable within any of the BU's, the OBIM when enclosed within one of the BU's being able to secure and release the corresponding ILM, unlocking of the ILM being inhibited when the ILM is secured and unlocking of the ILM being enabled when the ILM is released, the OBIM being thereby transferable between the cargo carriers as needed, so as to secure whichever of the cargo carriers is carrying the high value cargo, the OBIM being configured for wireless communication with external nodes when the OBIM is enclosed within one of the BU's and the corresponding cargo container is closed; and a Security management System (SMS) configured for wireless communication with the OBIM, the SMS including a processor and software configured so as to transmit a signal to the OBIM causing the OBIM to secure the ILM, and transmit a signal to the OBIM causing the OBIM to release the ILM.

2. The system of claim 1, wherein:

the OBIM is able to wirelessly receive and electronically store a master identity code, herein referred to as the Master Number (MN);

the system further comprises a Module Body Tag (MBT) displaying a visible indication of the MN, the MBT being durably attached to the OBIM in a location which is not visible when the OBIM is enclosed within one of the BU's; and the processor and software of the SMS are configured so as to direct the SMS to receive the MN from the OBIM.

3. The system of claim 2, wherein the software is able to direct the SMS to generate a temporary tracking code, herein referred to as a "Random Number" (RN), which is at least associated with the MN, transmit the RN to the OBIM, store the RN, the MN, and the association therebetween, and prevent access to the association between the RN and the MN except by authorized users.

4. The system of claim 2, wherein the software is further able to direct the SMS to store shipping information and to associate the shipping information with the MN, the shipping information including at least one of:

information pertaining to the high value cargo;

information pertaining to the container;

information pertaining to mobile entities scheduled to carry the container;

information pertaining to locations of temporary storage for the container while en route; and information pertaining to a planned route of travel for the container.

5. The system of claim 1, wherein each of the plurality of base units has an attachment configuration which is unique among the plurality of base units, the attachment configurations being configured such that for each of a plurality of different cargo container types among the plurality of cargo containers at least one of the base units is attachable thereto.

6. The system of claim 2 further comprising an External Encoded Tag (EET) including a visible indication of the MN, the EET being at least associated with the OBIM and being separable therefrom.

7. The system of claim 6, wherein the EET is configured for association with a shipping document after separation of the EET from the OBIM.

8. The system of claim 1, further comprising a detectable alarm unit which can be activated by the OBIM so as to emit an alarm indication which is at least one of audible and visible to individuals external to but proximate to the container, the detectable alarm unit being externally undetectable when the container is closed.

9. The system of claim 8, wherein the detectable alarm unit can be activated by a command received wirelessly by the OBIM from an authorized node.

10. The system of claim 1, wherein the OBIM is configured to release the ILM only upon wireless receipt by the OBIM of a specified unlocking signal.

11. The system of claim 10, wherein the unlocking signal is a composite signal including at least two of:

an rf signal transmitted at a first frequency;

an rf signal transmitted at a second frequency;

an acoustic signal;

a signal encoded by a first encoding method;

a signal encoded by a second encoding method;

a signal transmitted at a specified amplitude; and a signal transmitted at a specified time after a preceding signal.

12. The system of claim 1, wherein at least one digital signature is used by the OBIM to verify the identity of at least one of an external node and the SMS before responding to a wireless communication therefrom.

13. The system of claim 1, further comprising a tracking mechanism configured for wireless communication with the OBIM so as to at least obtain identifying information from the OBIM while the OBIM is en route within a cargo carrier.

14. The system of claim 13, further comprising a global positioning system (GPS) which is at least cooperative with the OBIM and enables the OBIM to at least one of record and report location information while the OBIM is en route within a cargo carrier.

15. The system of claim 13, further comprising a cellular telephone communication system which is at least cooperative with the OBIM and enables the OBIM to wirelessly communicate with an external node while the OBIM is en route within a cargo carrier.

16. The system of claim 13, wherein the tracking mechanism includes at least one monitoring station which is located along a route of travel of at least one of the cargo containers and which is configured to at least wirelessly receive identifying information from the OBIM when the OBIM is proximate to the monitoring station.

17. The system of claim 13, further comprising a route reporting mechanism configured to enable the OBIM contained within a cargo carrier to supply routing information to an operator of a mobile entity which is transporting the cargo container, the routing information being wirelessly obtained by the OBIM from the SMS.

18. A method for enhancing the security of high value cargo during shipment within an enclosed cargo container, and for tracking the cargo container while en route from an origin to a destination, the method comprising:

providing a plurality of cargo carriers, each of the cargo containers being an enclosed container that exclusively contains cargo;

for each of the cargo containers, providing an Internal Locking Mechanism (ILM) configured to prevent opening of the cargo container when the cargo container is closed and the ILM is locked, the ILM being externally undetectable when the cargo container is closed;

for each of the cargo containers, providing a Base Unit (BU) which is cooperative with the corresponding ILM and externally undetectable when the cargo container is closed;

providing an electronic OnBoard Identity Module (OBIM) which is removably enclosable within any of the BU's, the OBIM when enclosed within one of the BU's being able to secure and release the corresponding ILM, unlocking of the ILM being inhibited when the ILM is secured and unlocking of the ILM being enabled when the ILM is released, the OBIM being thereby transferable between the cargo carriers as needed, so as to secure whichever of the cargo carriers is carrying the high value cargo, the OBIM being configured for wireless communication with external nodes when the OBIM is enclosed within one of the BU's and the corresponding cargo container is closed, providing a Security management System (SMS) configured for wireless communication with the OBIM, the SMS including a processor and software configured so as to direct the SMS to transmit signals to the OBIM causing the OBIM to secure the ILM, and transmit signals to the OBIM causing the OBIM to release the ILM;

providing a tracking mechanism which is at least able to wirelessly obtain OBIM shipment identifying information from the OBIM when the OBIM is contained within a cargo container that is proximal to a specified location along a planned route of travel of the high value cargo;

selecting a cargo container from among the plurality of cargo containers;

enclosing the OBIM within the BU of the selected cargo container;

loading the high value cargo into the selected cargo container;

closing and securing the selected cargo container, including locking the ILM of the selected cargo container;

transmitting by the SMS of a signal to the OBIM causing the OBIM to secure the ILM of the selected cargo container;

while the selected cargo container is en route, using the tracking system to wirelessly receive identifying information from the OBIM so as to derive therefrom location information pertaining to the selected cargo container; and upon arrival of the selected cargo container at the destination, transmitting by the SMS of a signal to the OBIM causing the OBIM to release the ILM of the selected cargo container.

19. The method of claim 18, further comprising transmitting routing information to the OBIM while the selected cargo container is en route, and causing the OBIM to make the routing information available to an operator of a mobile entity which is transporting the selected cargo container.

20. The method of claim 18, further comprising causing the SMS to transmit a signal to the OBIM instructing the OBIM to cease transmission until a specified criterion is met.

21. The method of claim 18, wherein:

the OBIM is able to wirelessly receive and electronically store a master identity code, herein referred to as the Master Number (MN), a master body tag (MBT) including a visible indication of the MN being durably attached to the OBIM in a location which is not visible when the OBIM is enclosed within one of the BU's;

the processor and software of the SMS are configured so as to direct the SMS receive the MN from the OBIM, generate a temporary tracking code, herein referred to as a "Random Number" (RN), which is at least associated with the MN, transmit the RN to the OBIM, store the RN, the MN, and the association therebetween, and prevent access to the association between the RN and the MN except by authorized users;

the method includes causing the SMS to wirelessly receive the MN from the OBIM, generate an RN, transmit the RN to the OBIM, and store the MN, the RN, and the relationship therebetween; and using the tracking system to wirelessly receive identifying information from the OBIM includes using the tracking system to wirelessly receive the RN from the OBIM.

22. The method of claim 21, further comprising, upon detection of an abnormal indication from the OBIM, at least one of:

resolving by security-authorized personnel of any issues and assessing of the OBIM's security and integrity status;

advising by security-authorized personnel of a shipper of any and all related details, and informing of a receiver of details when and if directed to do so by the shipper;

conducting of steps to confirm that any suspected tampering did not violate the security of the BU of the selected cargo container or functionally alter its operation;

confirming proper OBIM security functionality;

replacing the OBIM if necessary, and repeating any necessary programming steps, as determined by the shipper and/or the receiver to be necessary to permit in-route control and tracking to resume; and if so identified initially, replacing an old RN tag or label on the mobile entity's exterior with a tag or label showing a replacement RN just assigned by the SMS for visual in-route monitoring by the tracking mechanism.

* * * * *